United States Patent [19]

Sjordal et al.

[11] Patent Number: 4,570,168

[45] Date of Patent: Feb. 11, 1986

[54] TWO-DIMENSIONAL INK JET ADJUSTMENT MECHANISM

[75] Inventors: Thomas R. Sjordal, Beaverton; David B. Kreitlow, Portland, both of Oreg.

[73] Assignee: Tektronix, Inc., Beaverton, Oreg.

[21] Appl. No.: 633,157

[22] Filed: Jul. 20, 1984

[51] Int. Cl.[4] ........................ G01D 15/00; B41B 1/00; B41J 11/20

[52] U.S. Cl. ...................................... 346/145; 346/75; 346/140 R; 33/163; 33/184.5; 400/55

[58] Field of Search ............... 346/139 C, 140 R, 141, 346/75, 145; 33/164 B, 170, 184.5, 163; 400/124, 55

[56] References Cited

U.S. PATENT DOCUMENTS

| | | | |
|---|---|---|---|
| 2,338,271 | 1/1944 | Ulanet | 33/164 B |
| 2,665,658 | 1/1954 | Welch | 33/172 |
| 2,842,421 | 7/1958 | Dreyfus | 346/140 R |
| 3,858,512 | 1/1975 | Simeth | 101/415.1 X |

*Primary Examiner*—E. A. Goldberg
*Assistant Examiner*—Gerald E. Preston
*Attorney, Agent, or Firm*—Allston L. Jones; Francis I. Gray

[57] ABSTRACT

Apparatus for adjusting the position in two dimensions of a device relative to a support. At least one strut is pivotally connected to the device and is connected to the support. The length of the strut between the device and support is controlled to translate and rotate the device to adjust its position.

5 Claims, 3 Drawing Figures

TWO-DIMENSIONAL INK JET ADJUSTMENT MECHANISM

BACKGROUND & SUMMARY OF THE INVENTION

This invention relates in general to ink jet devices and more particularly to a mechanism that enables individual ink jet heads to be simply and accurately aligned with one another. A typical instrument in which accurate alignment of ink jet heads is required is a multicolor plotter in which each ink jet head utilizes a different color. To accurately align each color pattern with the others, accurate relative alignment of the ink jet heads with one another must be achieved. In previous methods of adjusting the ink jet heads, the mounting screws for a head are loosened, the head is moved slightly by tapping with a tool, the mounting screws are tightened and then the ink jets are activated to determine their relative alignment. Such an approach results in a time consuming, iterative, inaccurate method of alignment. A low cost, compact, fine adjustment mechanism in two dimensions is therefore needed to enable quick accurate relative alignment of the ink jet heads.

The disclosed adjustment mechanism utilizes a mounting block attached to the ink jet device and a head holder to which the ink jet head is rigidly attached. After adjustment of a head holder, a clamping screw is utilized to rigidly hold the head holder to the mounting block. Either the hole in the head holder or the hole in the mounting block through which the clamping screw passes, or both, must be larger than the diameter of the clamping screw so that the head holder can be translated in at least one direction relative to the mounting block. At least one movable shaft connects the head holder to the mounting block to enable two-dimensional adjustment of the location of the head holder.

In the preferred embodiments, a pair of parallel threaded shafts are pivotally attached to the head holder and are utilized to adjust the head holder location. In one simple embodiment, each threaded shaft is permanently attached to its pivot in the head holder and an adjustment nut at the mounting block is utilized to move the shaft. In another embodiment enabling finer adjustment, each shaft has a different pitch thread on each end and each shaft threads into both its associated pivot and into threads in the mounting block. The motion of the head holder due to rotation of one of these shafts is therefore proportional to the difference in the pitch on each end of the shaft enabling finer adjustment than with a single pitch of thread. In both of these embodiments, each threaded shaft is enclosed by a compression spring between the head holder and the mounting block to remove play in the threads and to load the mating surfaces of the pivots and the head holder. The ink jet is preferrably not on the axis of the clamping screw so that translation of the ink jet can be achieved by rotation about the clamping screw as well as translation relative the clamping screw. In order to utilize such rotation to adjust the relative position of ink jets, the ink jet in an ink jet head should not be located on the axis of the clamping screw.

DESCRIPTION OF THE PREFERRED EMBODIMENT

Figure 1:
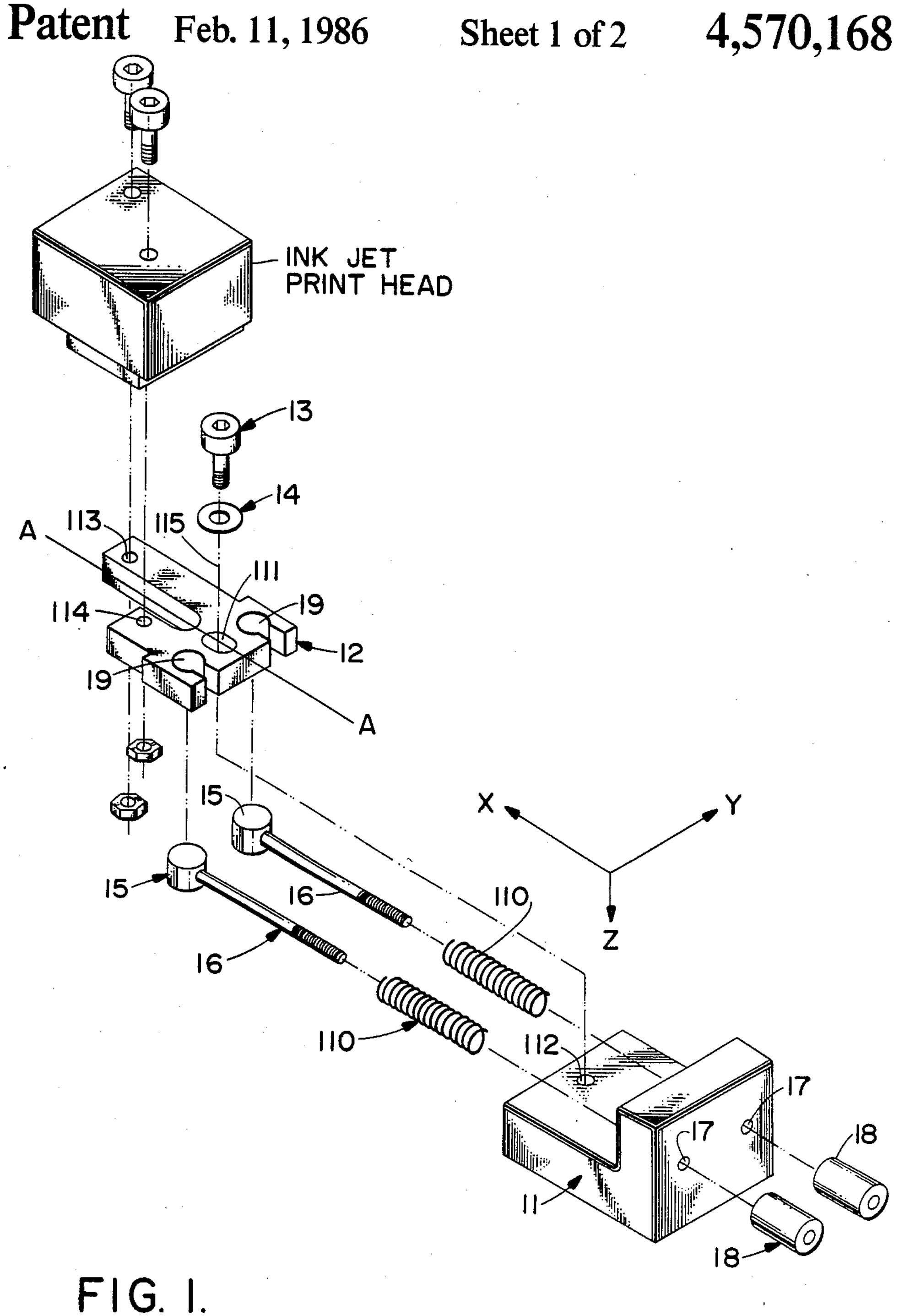
FIG. 1 shows an embodiment of the adjustment mechanism utilizing threaded shafts that are moved by rotation of an adjustment nut.

In this disclosure, the first digit in a reference numeral indicates the first figure in which the element indicated by that reference numeral is shown. In general, corresponding elements in different figures will differ only by the first digit of their reference numerals. In FIG. 1 there is shown an adjustment mechanism for adjusting in two dimensions the location of an ink jet. This mechanism includes a mounting block 11 that is rigidly mounted to an ink jet device, such as an ink jet plotter or printer. This mechanism also includes a head holder 12 to which an ink jet head is rigidly mounted. The head holder includes holes 113 and 114 through which head mounting screws are threaded into threaded holes in an ink jet head with the ink jet directed in the positive Z direction and lies along the axis A which is parallel to the X axis. In other embodiments, the head holder can be formed as an integral part of the ink jet head or can be attached to the head in a variety of ways.

A clamping screw 13 passes through a hole 111 in holder 12 into a threaded hole 112 in mounting block 11 to hold the head holder rigidly to the mounting block after the position of the head holder relative to the mounting block has been adjusted. A spring washer 14 is located between the head of clamping screw 13 and holder 12 to press the holder against mounting block 11 even when clamping screw 13 is loosened so that motion of head holder 12 is substantially planar during adjustment.

Each of a pair of threaded shafts 16 has one end attached to a pivot 15 which fits into an associated hole 19 in holder 12. The other end of each shaft fits through an associated hole 17 in mounting block 11 into an associated adjustment nut 18. Each shaft is enclosed by an associated compression spring 110 between mounting block 11 and holder 12 to remove play in the threads on shafts 16 and to load the mating surfaces of pivots 15 and the surface of holder 12 enclosing holes 19. Because of springs 110, rotation of adjustment nuts 18 can increase or decrease the distance between holder 12 and block 11. This structure produces superior accessibility for adjustment, because the adjustment mechanism need only be accessed from one side.

Hole 111 is larger than the diameter of the shaft of clamping screw 13 so that holder 12 can be translated in at least one direction. In the embodiment in FIG. 1, hole 111 has a width (in the y direction) substantially equal to the diameter of the shaft of screw 13 and has a length in the (x direction) greater than its width so that translation of the head is possible only in the x direction. Each of holes 19 has an equal displacement in the y direction from hole 111 so that equal rotation of nuts 18 in the same rotational direction will translate holder 12 in the x direction. Equal magnitude rotation of nuts 18 in opposite directions will rotate holder 12 about a point P midway between holes 19, which is located on axis A. In the embodiment in FIG. 1, the ink jet is displaced in the x direction from point P so that small rotations will translate the ink jet substantially in the y direction. Therefore, this adjustment mechanism enables adjustment of the ink jet in both the x and y directions. In addition, x and y displacements of the ink jet can be achieved by equal rotations of nuts 18 in the same or opposite directions, respectively. Of course, other adjustments of the head can be made using unequal or single adjustments of nuts 18.

Figure 2:
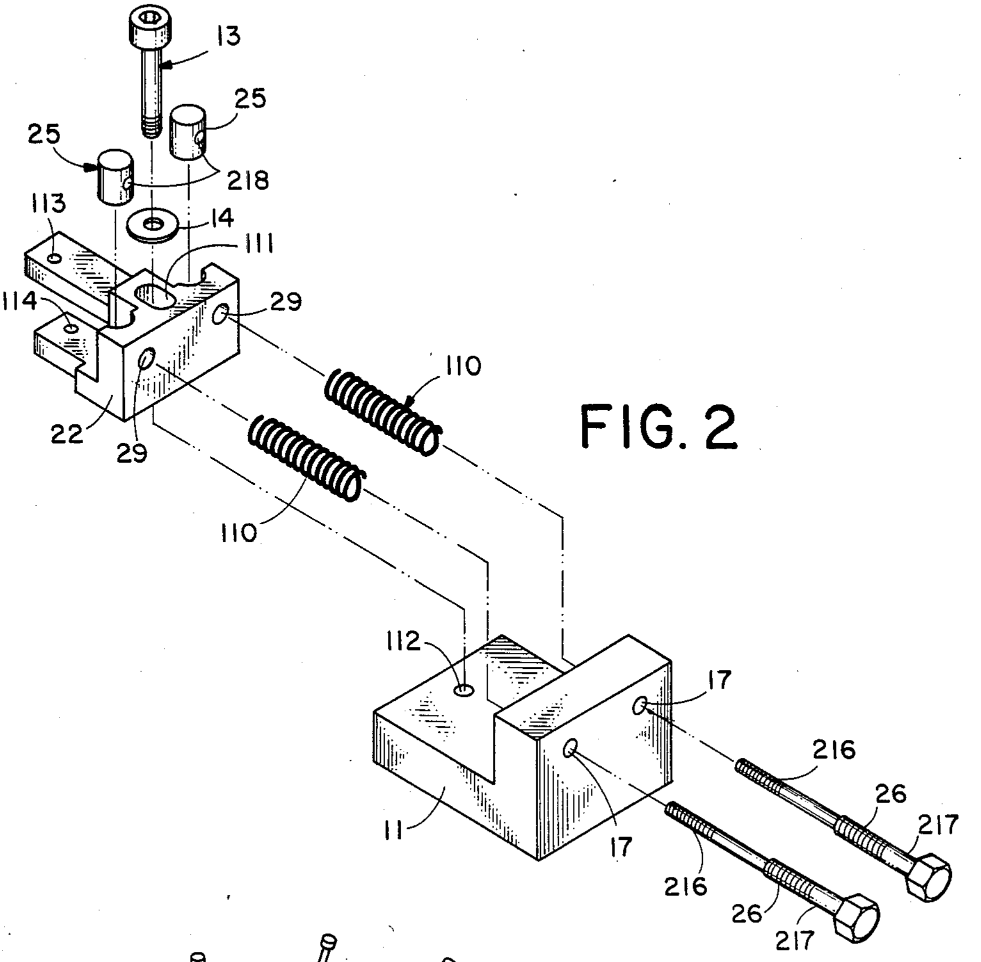
FIG. 2 shows an embodiment of the adjustment mechanism utilizing threaded screws that move the head holder by an amount proportional to the difference in pitch of threads on each end of the screws.

FIG. 2 shows an alternative embodiment in which the threaded shafts are a pair of adjustment screws 26. The threads near a first end 216 of each adjustment screw have a different pitch than the threads at the other end 217. The threads near end 216 screw into a threaded hole 218 in its associated pivot 25 and the threads near end 217 screw into its associated threaded hole 17. For each screw 26, the displacement of its associated pivot 25 along the x direction is proportional to the rotation of that screw times the difference in pitch of the threads on each end of that screw. This produces an increase in the accuracy with which the ink jet can be adjusted.

Figure 3:
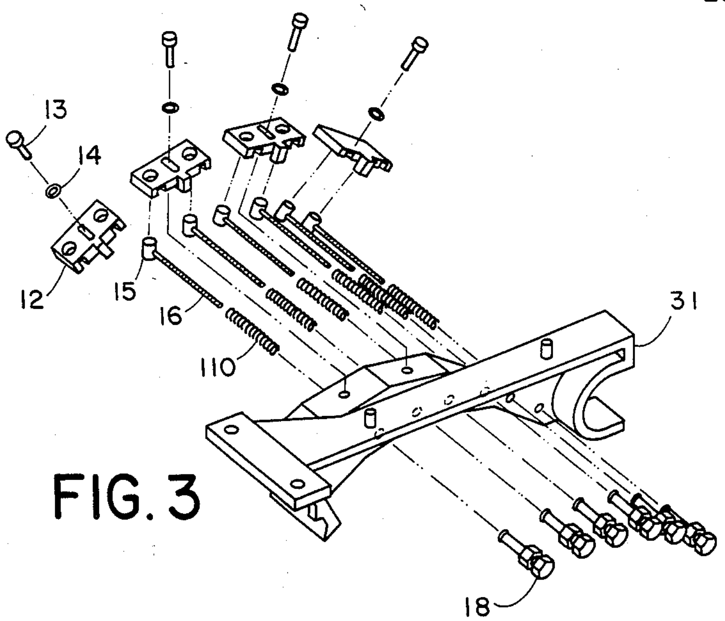
FIG. 3 shows a carriage on which four adjustable ink jet heads are mounted for use in a drum type plotter.

In FIG. 3 is shown a carriage assembly 31 on which are mounted four ink jet adjustment mechanisms of the type shown in FIG. 1. This carriage assembly 31 is for a drum type plotter in which each of the ink jet heads is to be located adjacent to the drum surface along the arc of a circle centered on the axis of the drum. In this embodiment, each of the mounting blocks 11 is part of an integral carriage 31.

In the embodiments shown in FIGS. 1 and 2, a pair of threaded shafts 16 or 26 are included in the adjustment mechanism to enable adjustment to be achieved in two dimensions and once relative alignment of the ink jet heads has been achieved, the clamping screws can be tightened down to maintain that alignment. However, a simpler embodiment can also be achieved that only includes one of the threaded shafts. For example, in the embodiment shown in FIG. 1, one of shafts 16 along with its associated structure (i.e., its associated hole 19, pivot 15, spring 110, hole 17 and nut 18) can be deleted. In such a structure, adjustment is achieved by loosening clamping screw 13 sufficiently that head holder slides in the x direction when nut 18 is rotated. Then the correct x adjustment of head holder 12 is achieved, clamping screw is lightly tightened so that holder 12 does not slide in the x direction when nut 18 is turned, but instead rotates about the clamping screw. The separation between holes 19 and 111 in the y direction should be selected to produce sufficient torque about the clamping screw that such a degree of tightening can be achieved. Nut 18 is then adjusted to rotate head 12 to produce a substantially y direction of displacement of the ink jet sufficient to adjust the x and y positions of the ink jet to their proper values relative to the other ink jets.

From the foregoing description, it will be apparent that the invention disclosed herein provides a novel and advantageous ink jet positioning device. As will be understood by those familiar with the art, the invention may be embodied in other specific forms without departing from the spirit or essential characteristics thereof.

I claim:

1. Apparatus for adjusting the position of a device, said apparatus comprising:

a support;

a device having a printhead included therewith;

mounting means for attaching the device to the support in a manner that restricts motion of the device to translation within a plane and rotation about an axis Z perpendicular to that plane;

a first strut connecting the device to the support along a line $L_1$ between a point $Q_1$ on the support and a point $P_1$ on the device, said strut being connected at point $P_1$ by a first pivot and said line $L_1$ not intersecting axis Z so that motion of the strut along line $L_1$ can produce rotation about axis Z; and means for increasing the length of the portion of the first strut extending between points $P_1$ and $Q_1$.

2. Apparatus as in claim 1 further comprising a second strut connecting the device to the support along a line $L_2$ between a point $Q_2$ on the support and a point $P_2$ on the device, said strut being connected at point $P_2$ by a second pivot and said line $L_2$ not intersecting axis Z so that motion of the second strut along line $L_2$ can produce rotation about axis Z; and means for increasing the length of the portion of the second strut extending between points $P_2$ and $Q_2$.

3. Apparatus as in claim 1:

wherein said first strut is attached to the first pivot and has a threaded shaft at point $Q_1$; and wherein said means for increasing the length of the portion of the first strut extending between points $P_1$ and $Q_1$ comprises:

a first nut which is threaded onto a threaded shaft, rotation of said nut inducing motion of the first strut along line $L_1$; and a spring which produces a bias between the first nut and the support so that rotation of the nut can move the strut in either direction along line $L_1$.

4. Apparatus as in claim 1 wherein said first strut has threads of a first pitch that thread into the first pivot and have threads of a second pitch, unequal to the first pitch, that thread into the support so that rotation of the strut increases the distance between points $P_1$ and $Q_1$ by an amount proportional to the difference between the first pitch and the second pitch.

5. Apparatus as in claim 1 wherein one of the set consisting of the support and the device contains an elongated slot through which is fitted a pin attached to the other of the elements in said set, said shaft having a width substantially equal to the diameter of said pin whereby the translational motion of the device is limited to one dimension.

* * * * *